(12) United States Patent
Archer et al.

(10) Patent No.: US 9,264,445 B2
(45) Date of Patent: *Feb. 16, 2016

(54) MOBILE APPLICATION SECURITY ASSESSMENT

(71) Applicant: Verizon Patent and Licensing Inc., Arlington, VA (US)

(72) Inventors: Steven T. Archer, Dallas, TX (US); Peter S. Tippett, Great Falls, VA (US); Gregory P. Crawford, Arlington Heights, IL (US); Paul Hubbard, San Diego, CA (US); Gina M. Ganley, Millstone Township, NJ (US); Jo Ann Joels, Tulsa, OK (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,234

(22) Filed: Sep. 8, 2014

(65) Prior Publication Data

US 2014/0380413 A1    Dec. 25, 2014

Related U.S. Application Data

(62) Division of application No. 13/477,489, filed on May 22, 2012, now Pat. No. 8,832,841.

(51) Int. Cl.
  *G06F 21/00* (2013.01)
  *H04L 29/06* (2006.01)
  *G06F 21/57* (2013.01)

(52) U.S. Cl.
  CPC ............ *H04L 63/1433* (2013.01); *G06F 21/00* (2013.01); *G06F 21/577* (2013.01); *H04L 63/20* (2013.01); *G06F 2221/033* (2013.01)

(58) Field of Classification Search
  CPC .... H04L 63/1433; H04L 63/20; G06F 21/629
  USPC ...................................................... 726/25, 22
  See application file for complete search history.

(56) References Cited

U.S. PATENT DOCUMENTS

| | | | |
|---|---|---|---|
| 8,832,841 | B2 | 9/2014 | Archer et al. |
| 2011/0119106 | A1 | 5/2011 | Dahl et al. |
| 2011/0145920 | A1* | 6/2011 | Mahaffey et al. ............... 726/22 |
| 2011/0167474 | A1* | 7/2011 | Sinha et al. ........................ 726/1 |
| 2012/0072991 | A1 | 3/2012 | Belani et al. |
| 2013/0167231 | A1 | 6/2013 | Raman et al. |

* cited by examiner

*Primary Examiner* — Syed Zaidi

(57) ABSTRACT

The security of mobile applications may be assessed and used to enhance the security of mobile devices. In one example, a method may include determining security scores of one or more mobile applications, the security scores defining a level of security risk corresponding to the one or more mobile applications. The method may further include receiving a policy relating to mobile applications that are permitted to be used by the mobile device, the policy including a threshold security score value; and receiving the requested security scores. The method may further include restricting use of selected ones of the one or more mobile applications when a security score corresponding to the one or more mobile applications is below the threshold security score value.

20 Claims, 9 Drawing Sheets

MOBILE APPLICATION SECURITY ASSESSMENT

RELATED APPLICATION

This application is a divisional of U.S. patent application Ser. No. 13/477,489, filed May 22, 2012 (now U.S. Pat. No. 8,832,841), the disclosure of which is incorporated herein by reference.

BACKGROUND

Mobile applications, also called mobile apps, are software applications, usually designed to run on smart phones and tablet computers. Mobile applications are commonly available through application distribution platforms, which are often operated by the owner of the mobile operating system, a telecommunication carrier, the device manufacturer, business enterprises, or industry consortiums (e.g. Android Developer Groups). Developers may create mobile applications and upload the mobile applications to the application distribution platform. Users may browse the mobile applications and download desired mobile applications to smart phones, tablet computers, and/or any device with a compatible operating system capable of running the application on behalf of the users.

The amount of review and/or quality checks relating to mobile applications, available to an application distribution platform, may vary based on the application distribution platform. For some application distribution platforms, user feedback relating to mobile applications may be the primary method through which users browsing the mobile applications judge the quality of the mobile application. Feedback ratings, from a typical user, may be primarily directed to the features provided by the mobile application and the user interface presented by the mobile application.

DETAILED DESCRIPTION OF PREFERRED EMBODIMENTS

Figure 1:
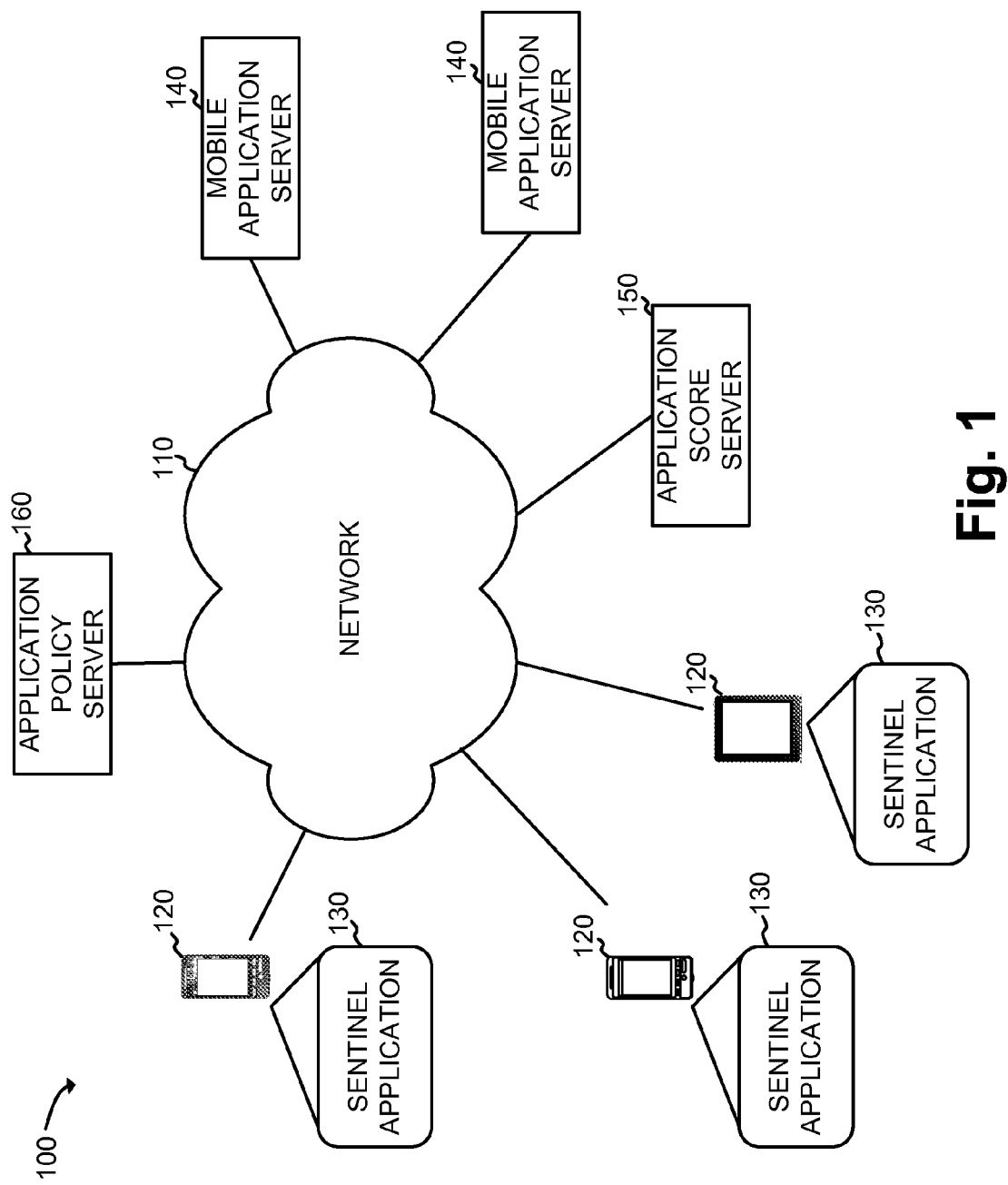
FIG. 1 is a diagram of an example environment in which systems and/or methods described herein may be implemented.

The following detailed description refers to the accompanying drawings. The same reference numbers in different drawings may identify the same or similar elements.

Techniques described herein may provide for systems and/or methods that assess the security or other attributes (for example reliability) of mobile applications.

Security assessment may be implemented based on an initial security score that is obtained for mobile applications. The security score may be augmented based on additional automated and/or manual analysis of the binary or source code and/or observed behavior of the mobile application. For example, all mobile applications may be assigned a basic security score. Developers may choose to submit a mobile application for a more comprehensive security analysis based on the binary or source code and/or observed behavior of the mobile application. A mobile application that undergoes the more comprehensive security analysis may be eligible for an increased security score.

The mobile application security scores may be used in a number of ways. In one implementation, a user may be able to view the security score of a mobile application that the user is considering installing. Alternatively or additionally, a user may be provided with a list of all the mobile applications that are installed on the user's mobile device and a corresponding list of security scores. In this way, a user may perform a self audit relating to the security of the installed mobile applications.

In some implementations, corporations or other entities that deploy a number of mobile devices, such as mobile devices given to employees of the corporation, may create policies, for the mobile devices, based on the security scores. For example, certain employees, such as those employees that deal with sensitive company information, may only be allowed to install mobile applications that have at least a first threshold value security score. Other employees may only be allowed to install mobile applications that have at least a second threshold value, lower than the first threshold value, security score.

The term security, as used herein in the context of mobile applications installed on mobile devices, may relate to the trustworthiness of the mobile application to intentionally or unintentionally create security risks for the mobile device. The term "security" may be broadly defined as any characteristic, attribute, function, etc. of a mobile application which is being assessed to determine if the application causes harm or the risk of harm to the mobile device, causes harm or the risk of harm to any device to which the mobile device is connected, or causes harm, risk of harm or any other negative effect to the user of the mobile application. A security risk may broadly be defined as a risk that the mobile device, without explicit or implied user permission, will monitor user actions, provide data of the user or the mobile device to another entity, and/or enable a malicious application or service to monitor and/or obtain data relating to the user or the mobile device.

FIG. 1 is a diagram of an example environment 100 in which systems and/or methods described herein may be implemented. As illustrated, environment 100 may include a network 110 that connects a number of devices and/or systems. The devices and/or systems may include mobile devices 120 and servers 140, 150, and 160.

Network 110 may include one or more networks of any type, such as a local area network (LAN), a wide area network (WAN), a metropolitan area network (MAN), a telephone network, such as the Public Switched Telephone Network (PSTN) or a Public Land Mobile Network (PLMN), an intranet, the Internet, or a combination of networks. Network 110 may include one or more wireless portions that provide wireless connectivity to mobile devices 120. Alternatively or additionally, network 110 may provide a wired connection to mobile devices 120.

Mobile devices 120 may include portable computing and communication devices, such as a personal digital assistant (PDA), a smart phone, a cellular phone, a laptop computer with connectivity to a wireless network, a tablet computer, etc. Mobile devices 120 may connect, through network 110, to one or more of servers 140, 150, and 160. Although devices 120 will generally be described as mobile devices herein, in some implementations, devices 120 may include fixed devices, such as desktop computers, media centers, or other computing devices that are not designed for portability.

Each of mobile devices 120 may include one or more mobile applications that are installed on the mobile device. One mobile application that may be particularly installed on mobile devices 120 includes a sentinel application 130, which may include a mobile application that provides information relating to the security scores of other mobile applications that are installed on a mobile device 120. Sentinel application 130 may be installed as a background service. In some implementations, sentinel application 130 may inform the user, of mobile device 120, of the security scores of mobile applications that are being browsed, at mobile application server 140, or that are about to be installed on mobile device 120. In other implementations, sentinel application 130 may provide additional functionality, such as filtering or blocking mobile applications that have insufficient security scores. Sentinel application 130 will be described in more detail below with reference to FIGS. 6-9.

Environment 100 may additionally include servers 140, 150, and 160. These servers may include mobile application servers 140, an application score server 150, and an application policy server 160.

Mobile application servers 140 may include web servers, application servers, or other types of servers that provide an application distribution platform for mobile applications that are to be installed and/or executed by mobile devices 120. For example, a mobile application server 140 may provide an online application store in which users of mobile devices 120 can browse and install mobile applications. Mobile application server 140 may also allow users to provide feedback relating to the quality of mobile applications that the users have downloaded.

Application score server 150 may include web servers, application servers, or other types of servers that generate, maintain, and display security scores relating to the security of mobile applications. The security scores may include scores that are automatically generated from publicly available mobile application data. The automatically generated security scores may be additionally augmented based on an automated and/or manual analysis of the code corresponding to the mobile application. The operation of application score server 150 will be described in more detail below with reference to FIGS. 3-5.

Application policy server 160 may include web servers, application servers, or other types of servers that allow corporations or other entities to implement policies for one or more mobile devices 120. For example, each mobile device 120, that is controlled by a particular entity, may be assigned a policy that restricts certain mobile applications from being downloaded, installed, or executed. The policy may be based on security scores provided by application score server 150. Application policy server 160 will be described in more detail below with reference to FIGS. 8 and 9.

One network 110, three mobile devices 120, two mobile application servers 140, one application score server 150, and one application policy server 160 are illustrated in FIG. 1 for simplicity. In practice, there may be additional or fewer networks 110, mobile devices 120, mobile application servers 140, application score servers 150, and/or application policy servers 160. Mobile application servers 140 and application score server 150, although shown as a single component in FIG. 1, may, in practice, be implemented as one or more computing devices that may potentially be geographically distributed.

Although FIG. 1 shows example components of environment 100, in other implementations, environment 100 may contain fewer components, different components, differently arranged components, or additional components than those depicted in FIG. 1. Alternatively, or additionally, one or more components of environment 100 may perform one or more tasks described as being performed by one or more other components of environment 100.

Figure 2:
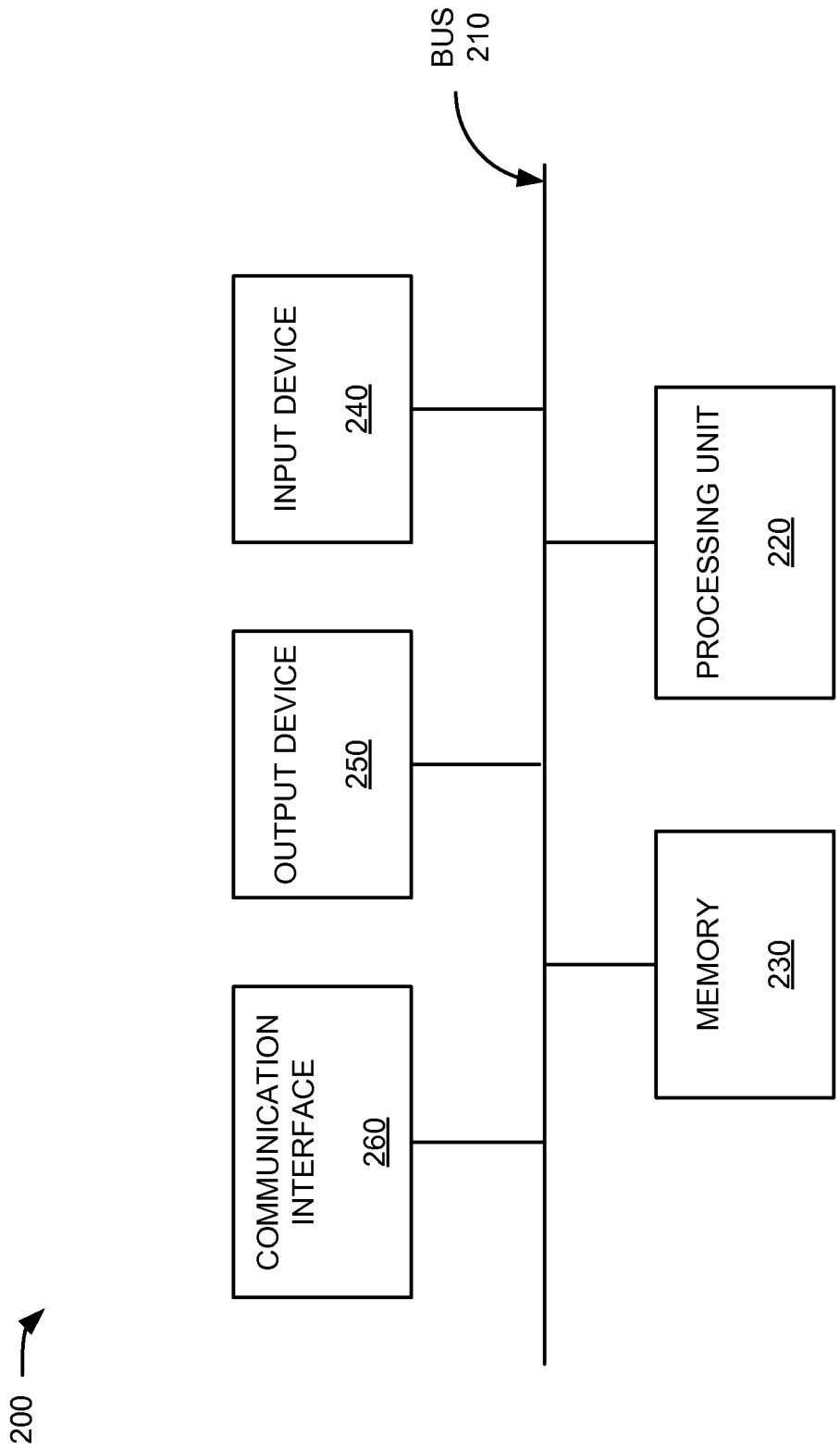
FIG. 2 is a diagram of example components of a device that may correspond to one or more of the devices shown in FIG. 1.

FIG. 2 is a diagram of example components of a device 200 that may correspond to one or more devices of environment 100, such as one of mobile devices 120, mobile application servers 140, application score server 150, or application policy server 160. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more Application Specific Integrated Circuits (ASICs), Field Programmable Gate Arrays (FPGAs), or the like.

Memory 230 may include a random access memory (RAM) or another type of dynamic storage device that stores information and instructions for execution by processing unit 220, a read-only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touchscreen display, one or more biometric mechanisms, and the like. When device 200 includes one of mobile devices 120, input device 240 may particularly include a touchscreen display or a keyboard or keypad designed for mobile devices 120. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices associated with environment 100. When device 200 includes one of mobile devices 120, communication interface 260 may include antennas and other circuitry associated with wireless communication.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more tasks described as being performed by one or more other components of device 200.

Figure 3:
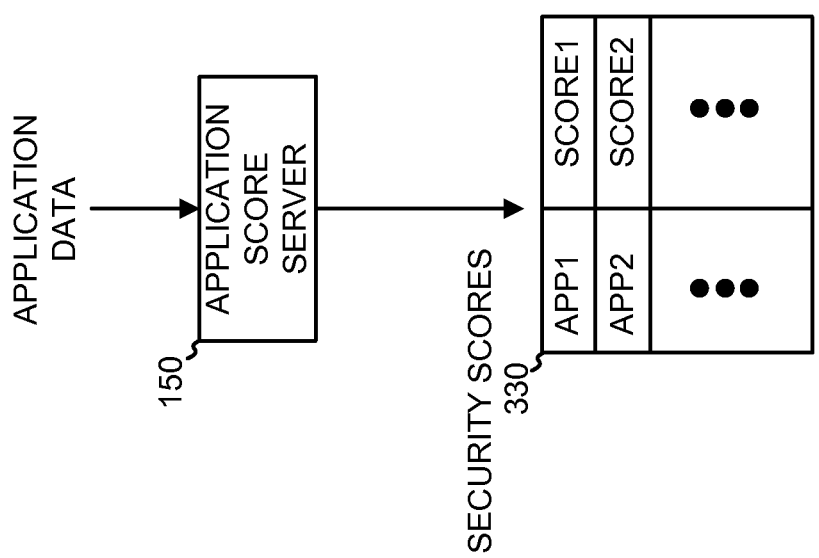
FIG. 3 is a diagram of operations relating to the application score server shown in FIG. 1.

FIG. 3 is a diagram of example operations relating to application score server 150. As illustrated in FIG. 3, application score server 150 may generate or obtain security scores for mobile applications hosted by mobile application servers 140. Each security score may include a value that relates to the security of a mobile application. In one implementation, security scores may be generated as a real value within a predefined range in which higher values represent a more secure mobile application. For example, each security score may be a value between zero and three, where zero is the lowest (least secure) score possible and three is the highest (most secure) score possible. The security scores may be generated or obtained using a number of possible techniques. For example, each security score may correspond to a score generated based on user ratings for a mobile application or based on other data relating to the mobile application. In general techniques for ranking documents or applications are known in the art and can be applied to obtain the security scores for the mobile applications.

The security scores calculated may be stored by application score server 150. The security scores may later be transmitted to other devices, such as to sentinel applications 130 on mobile devices 120.

As shown in FIG. 3, security scores, generated by application score server 150, are illustrated as security scores 330, which may be stored in a data structure, such as a table. Security scores 330 may relate mobile applications (APP1, APP2, . . . ) to corresponding security scores (SCORE1, SCORE2, . . . ).

As discussed above, security scores 330 may be determined by application score server 150. Security scores 330 may be additionally augmented or modified based on the result of a more in-depth analysis of a mobile application. In one implementation, the more in-depth analysis may at least partially include an analysis that includes a manual component, such as an analysis done under the supervision of a technician. The in-depth analysis may be an optional analysis in which the developer of a mobile application may opt-in to the analysis. In one implementation, the in-depth analysis may allow for a higher security score for a mobile application. For example, a mobile application may be limited, based on only the analysis performed by the application score server 150, to a maximum security score of three. If the developer of the mobile application chooses to have the additional analysis performed, the maximum potential security score for mobile application may be increased (e.g., up to five).

Figure 4:
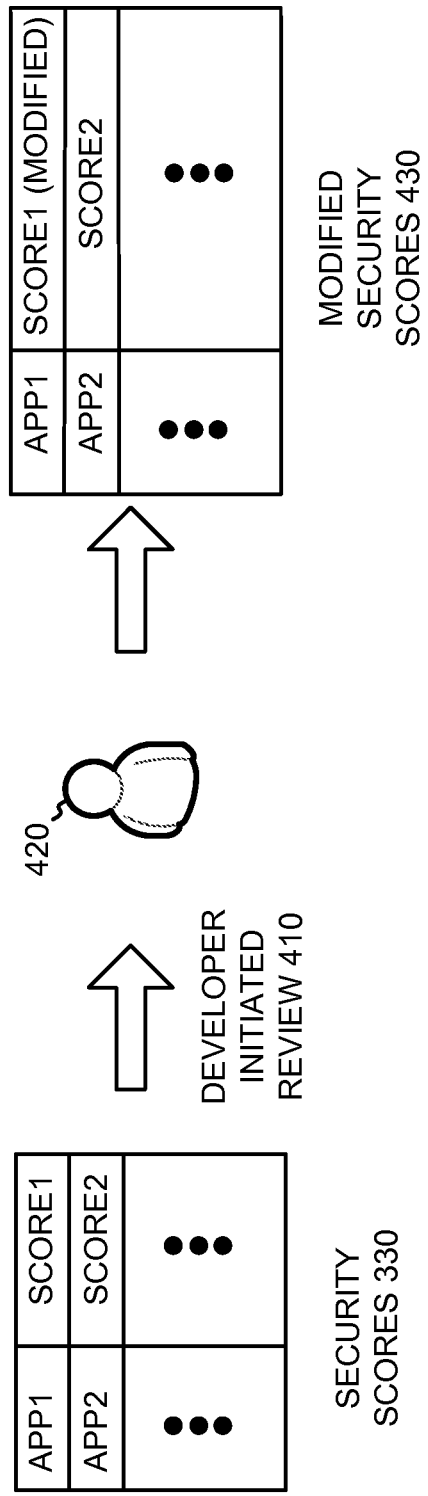
FIG. 4 is a diagram of example operations relating to the modification of security scores, for mobile applications, based on an in-depth analysis of a mobile application.

FIG. 4 is a diagram of example operations relating to the modification of security scores, for mobile applications, based on an in-depth analysis of a mobile application. As previously discussed, security scores 330 may include security scores, for mobile applications, that were automatically generated, by application score server 150, based on publically available data relating to the mobile applications. Developers of the mobile applications may be given the option of initiating an additional security review process (DEVELOPER INITIATED REVIEW 410) that provides a more in-depth review of the mobile application by a reviewer 420.

Reviewer 420 may represent one or more computer scientists, security specialists, or other human operators trained to review mobile applications based on security risks. Reviewer 420 may evaluate a mobile application based on a combination of manual inspection and/or the application of automated security assessment tools. Security assessment tools for computer programs are known and will not be described in detail herein. Reviewer 420 may manually check a number of features of the source code of a mobile application and review the results of a number of automated security assessment tools applied to the mobile application. Based on the results of the automated security assessment tools, reviewer 420 may take further actions relating to the in-depth security assessment.

In one implementation, the developer may be given the choice of a number of possible levels of an in-depth review. For example, a first level of in-depth review (referred to as IN-DEPTH SECURITY REVIEW_1 in FIG. 5, below) may include analysis of the binary version of the mobile application using one or more automated assessment tools. The analysis may be automatically performed or may be performed or controlled by reviewer 420. A second level of in-depth review (referred to as IN-DEPTH SECURITY REVIEW_2 in FIG. 5) may additionally include analysis of the source code of the mobile application, by reviewer 420, using one or more automated and/or manual code assessment tools. The second level of in-depth review may generally require more time and/or expertise by reviewer 420. The second level of in-depth review may generally be designed to identify potential security risks through hands-on functional testing, deep inspection of the permissions assigned and used by the mobile application, input validation, authentication and authorization performed by the mobile application, and/or error handling performed by the mobile application.

In one implementation, the in-depth security review may be conducted based on a number of security categories, such as the four categories: authenticity, reliability, safety (including vulnerability and malice), and privacy. Security scores may be generated for each of the categories and the scores may be combined (e.g., by averaging or summing the category security scores to obtain a score corresponding to the in-depth security review).

Figure 5:
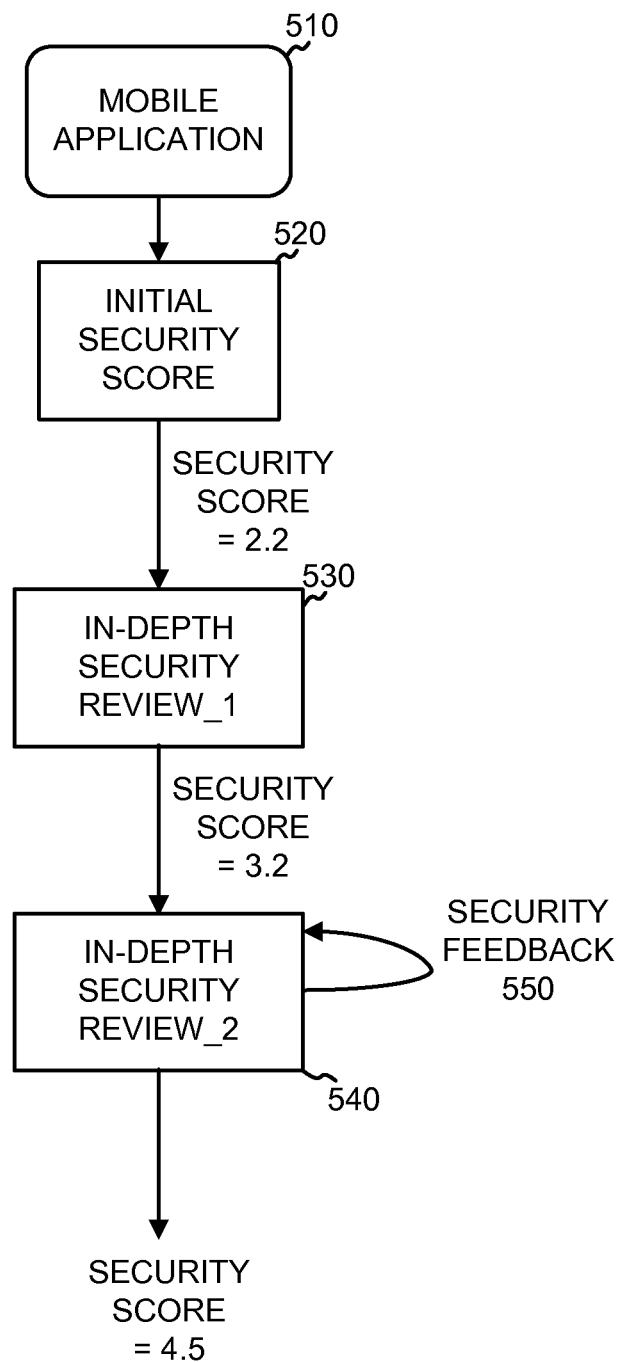
FIG. 5 is diagram illustrating an example of a security review process to obtain a security score for a mobile application.

As a result of the in-depth security review, security scores 330, for selected ones of the mobile applications, may be modified to obtain modified security scores 430. In one implementation, the in-depth security review may enable the security score, for a particular mobile application, to be increased by up to a certain value. For example, a maximum security score based solely on the automated analysis, by application score server 150, may be three, and the maximum security score based on a combination of the automated and in-depth analysis of source code of the mobile application may be five. FIG. 5 is a diagram illustrating an example of a security review process to obtain a security score for a mobile application.

In FIG. 5, assume that a developer has developed a mobile application 510. The developer may publish mobile application 510 to one or more mobile application servers 140. Application score server 150 may automatically generate a security score for mobile application 510 (AUTOMATED ANALYSIS 520). The automated analysis may be performed without input from the developer and/or without waiting for a specific decision from the developer.

Application score server 150 may occasionally adjust the automatically generated security score, such as in response to user reviews of mobile application 510, developer updates to mobile application, or in response to other changes in application data 310/320 that relate to mobile application 510. As illustrated, in this example, the automatically assigned security score may be 2.2 (from a possible range of zero to three).

The developer may choose to submit mobile application 510 for a more in-depth security review. In this example, assume that two levels of in-depth security review are offered by the entity that maintains application score server 150. The developer may initially choose a first level of in-depth review. The developer may, for example, fill out a form, including information about the developer, and may submit the binary version of mobile application 510 for review. A reviewer 420 may oversee a security review of mobile application 510 using one or more automated code assessment tools (IN-DEPTH SECURITY REVIEW_1 530). Alternatively, the in-depth review may be a completely automated analysis of the binary version of mobile application 510.

As a result of the first in-depth security review, assume that the security score for mobile application 510 is increased to 3.2 (out of a maximum of 4.0). The developer may choose to submit mobile application 510 to another, more rigorous, in-depth security review (IN-DEPTH SECURITY REVIEW_2 540). Although IN-DEPTH SECURITY REVIEW_1 530 and IN-DEPTH SECURITY REVIEW_2 are illustrated, in FIG. 5, as being performed sequentially, the in-depth security reviews may be independent from one another. For instance, a developer may choose only to initiate a first-level in-depth security review, to initiate only a second-level in-depth security review, or both in-depth security reviews. In some implementations, a developer of a private mobile application may skip the automated analysis and elect to have the first or second in-depth security review performed.

The developer may, for example, fill out a form, including information about the developer, and submit the binary version of mobile application 510 as well as the source code version of mobile application 510, for review. Reviewer 420 may oversee a security review of mobile application 510 using one or more automated and/or manual code assessment tools. The assessment of mobile application 510 may include an analysis of the source code. In some implementations, as part of the review process, the developer may be provided with feedback (SECURITY FEEDBACK 550), and in response may modify mobile application 510 to increase the security of mobile application 510. As a result of the second in-depth security review, assume that the security score for mobile application 510 is increased to 4.5 (out of a maximum of 5.0).

The security scores generated by application score server 150 may be used in a number of ways. For example, application score server 150 may provide a web interface through which users can view security scores of mobile applications. As another example, the security scores may be provided to users that are about to install mobile application as part of a final confirmation before installation. As another example, sentinel application 130 may provide the security scores, of installed mobile applications, to a user of mobile device 120. As yet another example, sentinel application 130 may use the security scores to enforce policies at mobile device 120.

Figure 6:
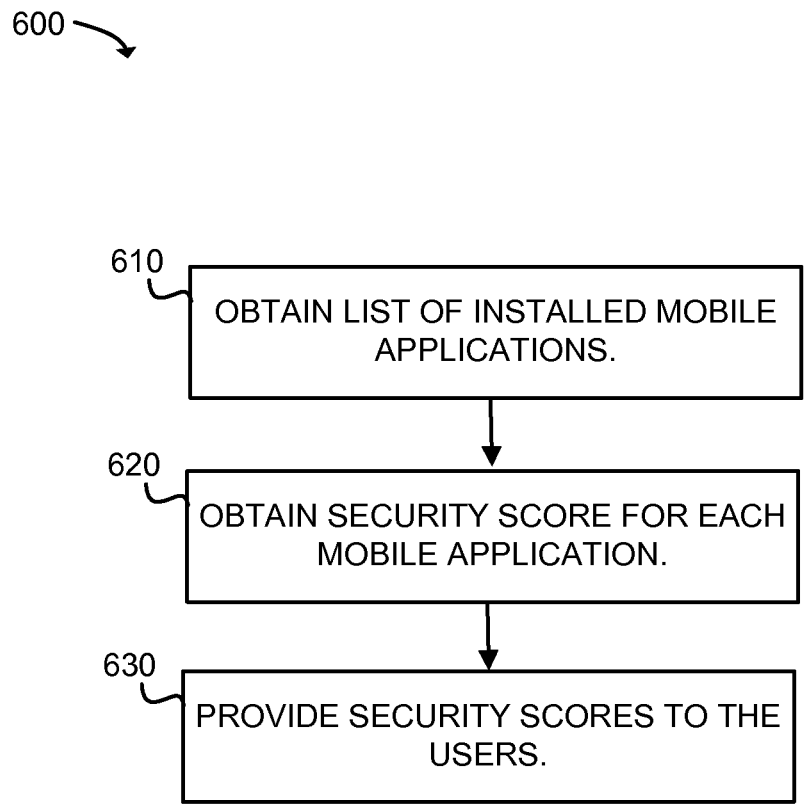
FIG. 6 is a flow chart illustrating an example process relating to a sentinel application.

FIG. 6 is a flow chart illustrating an example process 600 relating to sentinel application 130. Process 600 may be performed, for example, by sentinel application 130, when sentinel application 130 is initially started, when requested by a user, or on a predefined recurring schedule.

Process 600 may include obtaining a list of mobile applications that are installed on mobile device 120 (block 610). Sentinel application 130 may, for example, obtain the list of installed applications from the operating system of mobile device 120. Alternatively or additionally, sentinel application 130 may obtain the list using other techniques. For instance, a user may manually identify the mobile applications in which the user is interested.

Process 600 may further include obtaining the security score for each mobile application in the list (block 620). For instance, sentinel application 130 may query application score server 150 to obtain a security score for each mobile application.

Process 600 may further include providing the security scores to the user (block 630). In one implementation, the security scores may be presented in a table that provides the name of each mobile application and the corresponding security score. In some implementations, the security scores may be color coded or otherwise visually distinguished so that low security scores are highlighted. For example, security scores below a first threshold may be shown using a red font and security scores above a second threshold may be shown using a green font.

Through the operation of sentinel application 130, a user can quickly assess the security risk of the various applications that are installed on mobile device 120. The user may then choose to take remedial action, such as by uninstalling certain mobile applications.

Figure 7:
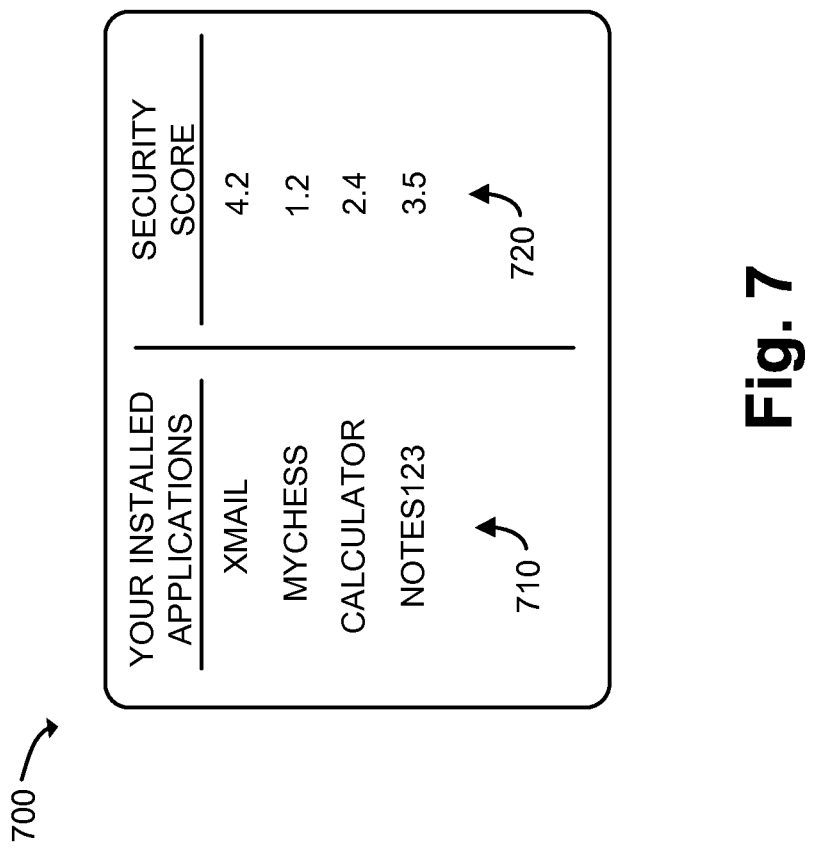
FIG. 7 is a diagram illustrating an example user interface that may be presented by the sentinel application.

FIG. 7 is a diagram illustrating an example user interface 700 that may be presented by sentinel application 130. Interface 700 may be presented, for example, in response to a user opening sentinel application 130 or in response to a user selecting a command within sentinel application 130. As illustrated, interface 700 may provide a list of mobile applications 710 that are installed on mobile device 120. List of mobile applications 710 may include all of the mobile applications installed on mobile device 120 or a subset of the mobile applications installed on mobile device 120. For each mobile application that is provided in list of mobile applications 710, a security score 720 corresponding to the mobile application may also be provided to the user.

In the description with respect to FIGS. 6 and 7, the security scores were used by sentinel application 130 as a way to inform the user of mobile device 120 of the potential security risks associated with mobile applications. Alternatively or additionally, and as will be described with respect to FIGS. 6 and 7, sentinel application 130 may interact with application policy server 160 to provide support for policies that are based on the security scores.

Figure 8:
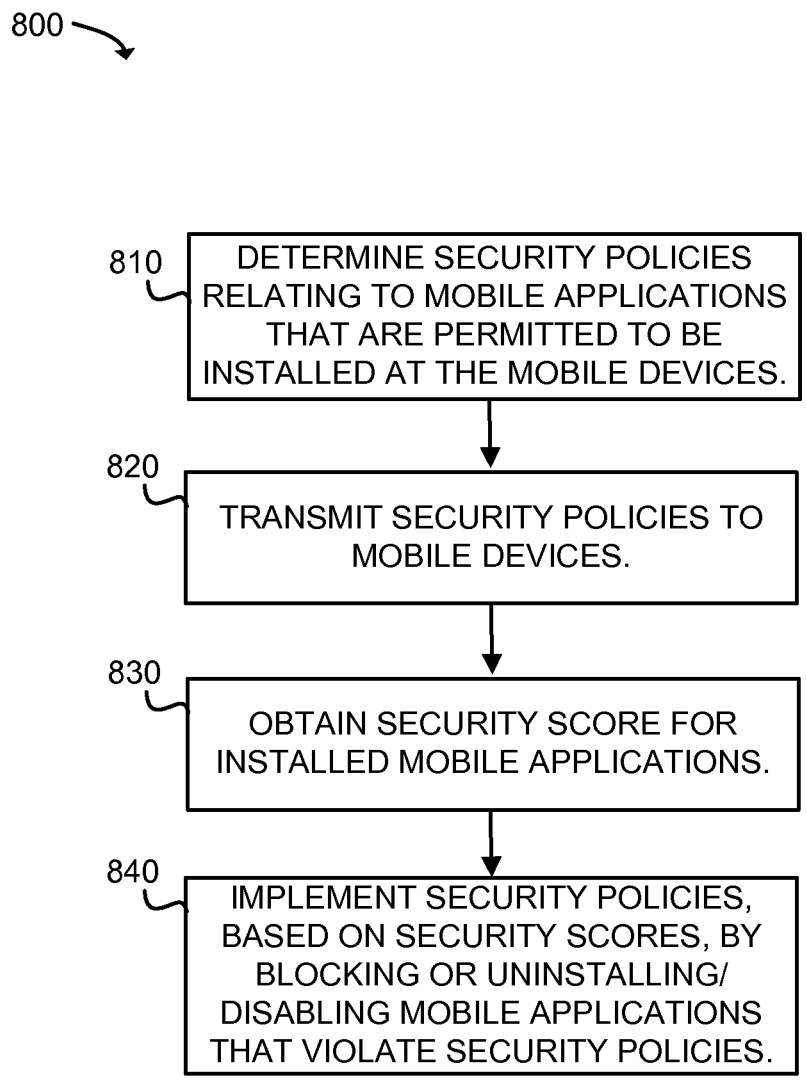
FIG. 8 is a flow chart illustrating an example process relating to another implementation of the sentinel application.

FIG. 8 is a flow chart illustrating an example process 800 relating to another implementation of sentinel application 130. Process 800 may be performed, for example, by a combination of application policy server 160 and mobile device 120. With respect to the operations of mobile devices 120, process 800 may be performed by sentinel applications 130.

Process 800 may include determining policies for mobile devices (block 810). The policies may generally relate to mobile applications that are permitted to be installed and run on mobile devices 120 (block 810). For example, a corporation or other entity may manage a number of mobile devices 120, such as mobile devices provided to employees of the corporation. It may be desirable that different employees of the corporation be associated with different security constraints. In this case, the corporate policies may indicate that a first group of employees may install and/or use mobile applications only if the mobile applications have at least a first security score. A second group of employees may install and/or use mobile applications when the mobile applications have at least a second security score. In other implementations, other rules may be enforced by the policies. For example, the policy may indicate that any mobile application that uses location tracking may not be installed and/or used.

Process 800 may further include transmitting the policies to the relevant mobile devices (block 820). Application policy server 160 may, for example, transmit a message to sentinel application 130 of each mobile device 120 that is the subject of a policy. The message may include the particular policy for mobile device 120. Sentinel application 130 may receive the message and may implement the policies included in the message.

Process 800 may further include obtaining the security score for each installed mobile application (block 830). For instance, sentinel application 130 may query application score server 150 to obtain a security score for each mobile application that is installed on the mobile device.

Process 800 may further include implementing the policies by blocking installation, uninstalling and/or disabling, or requesting that the user uninstall and/or disable installed mobile applications that violate the policies (block 840). In one implementation, sentinel application 130 may block the installation of mobile applications that do not meet the policies installed on mobile device 120. Alternatively or additionally, sentinel application 130 may block the execution of mobile applications that do not meet the policies installed on mobile device 120. Alternatively or additionally, sentinel application 130 may notify the user or notify an administrator, at application policy server 160, when an application is executed that does not meet the policies installed on mobile device 120. In general, the policies may be implemented using the security scores that were obtained from application score server 150.

Figure 9:
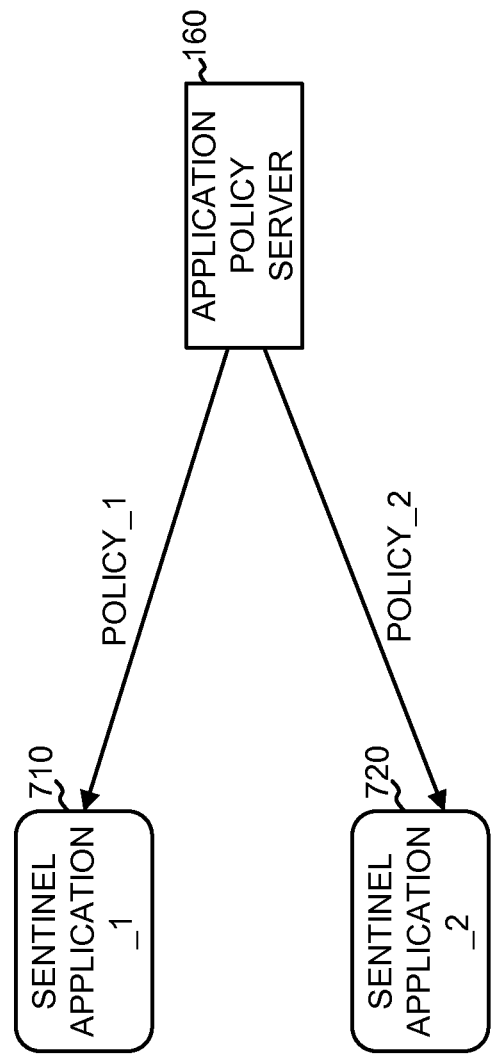
FIG. 9 is a diagram illustrating an example of the operation of an application policy server shown in FIG. 1.

FIG. 9 is a diagram illustrating an example of the operation of application policy server 160. As shown, in this example, application policy server 160 may provide policies to two mobile devices, the first of which may execute sentinel application 710 (SENTINEL APPLICATION_1) and the second of which may execute sentinel application 720 (SENTINEL APPLICATION_2). Application policy server 160 may transmit a policy, POLICY_1, to sentinel application 710 and may transmit another policy, POLICY_2, sentinel application 720. Sentinel applications 710 and 720 may operate based on the respective policies to potentially implement different rules or constraints. For example, sentinel application 710 may only allow certain categories of mobile applications to be executed at the mobile device associated with sentinel application 710. As another example, sentinel application 720 may only allow mobile applications having a security score greater than a threshold value to be executed at the mobile device associated with sentinel application 720.

As described above, mobile applications may be automatically evaluated and given scores based on the security risks associated with the mobile applications. Different levels of security assessment may be available to a developer of a mobile application. For example, a developer may choose to submit a mobile application for a more in-depth security assessment of the mobile application. An application or service that executes at a mobile device may enable users of the mobile device or entities that have control or responsibility of the mobile device to easily make security and risk based policy decisions relating to the security risks that are acceptable to the owners of the mobile device.

The foregoing description of implementations provides illustration and description, but is not intended to be exhaustive or to limit the implementations to the precise form disclosed. Modifications and variation are possible in light of the above teachings or may be acquired from practice of the invention.

For example, while series of blocks have been described with regard to FIGS. 6 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code, it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   requesting, by a mobile device, one or more security scores of one or more mobile applications,
   the one or more security scores defining a level of security risk corresponding to the one or more mobile applications, and
   a security score, of the one or more security scores, being based on:
   a first security review performed on a mobile application of the one or more mobile applications,
   the first security review resulting in a modified initial security score including a value within a first range, and
   a second security review performed on the mobile application,
   the second security review being different than the first security review, and
   the second security review resulting in a further modified initial security score including a value within a second range,
   the second range including an upper limit that is greater than an upper limit of the first range;
   receiving, by the mobile device, a policy relating to mobile applications that are permitted to be used by the mobile device,
   the policy including a threshold security score value;
   receiving, by the mobile device, the requested one or more security scores; and restricting, by the mobile device, use of a selected mobile application, of the one or more mobile applications, when a security score, of the one or more received security scores, corresponding to the selected mobile application is below the threshold security score value.

2. The method of claim 1, where the restricting the use of the selected mobile application includes:
preventing the selected mobile application from being installed on the mobile device;
preventing the selected mobile application from being executed by the mobile device;
providing a user of the mobile device with a notification when the selected mobile application is executed by the mobile device; or
uninstalling the selected mobile application from the mobile device.

3. The method of claim 1, further comprising:
providing a graphical indication of a plurality of mobile applications that are installed on the mobile device and corresponding security scores of the installed plurality of mobile applications.

4. The method of claim 1, where the requested one or more security scores correspond to security scores of mobile applications installed at the mobile device.

5. The method of claim 1, where the requested one or more security scores include security scores determined, at least in part, through a manual analysis of the mobile applications.

6. The method of claim 1, further comprising:
providing, for presentation, the requested one or more security scores.

7. The method of claim 1, where
when requesting the one or more security scores, the method includes:
requesting a first security score, of the one or more security scores, for a first mobile application of the one or more mobile applications; and
requesting a second security score, of the one or more security scores, for a second mobile application of the one or more mobile applications,
when receiving the requested one or more security scores, the method includes:
receiving the first security score, and
receiving the second security score, and
the method further includes:
providing, for presentation, the received first security score and the received second security score.

8. A device comprising:
a processor to:
request one or more security scores for one or more mobile applications,
the one or more security scores defining a level of security risk corresponding to the one or more mobile applications, and
a security score, of the one or more security scores, being based on:
a first security review performed on a mobile application of the one or more mobile applications,
the first security review resulting in a modified initial security score including a value within a first range, and
a second security review performed on the mobile application,
the second security review being different than the first security review, and
the second security review resulting in a further modified initial security score including a value within a second range,
the second range including an upper limit that is greater than an upper limit of the first range;
receive a policy relating to mobile applications that are permitted to be used by the device,
the policy including a threshold security score value;
receive the requested one or more security scores; and
restrict use of a selected mobile application, of the one or more mobile applications, when a security score, of the one or more received security scores, corresponding to the selected mobile application is below the threshold security score value.

9. The device of claim 8, where, when restricting the use of the selected mobile application, the processor is to:
prevent the selected mobile application from being installed on the device;
prevent the selected mobile application from being executed by the device;
provide a user of the device with a notification when the selected mobile application is executed by the device; or
uninstall the selected mobile application from the device.

10. The device of claim 8, where the processor is further to:
provide a graphical indication of all a plurality of mobile applications that are installed on the device and corresponding security scores of the installed plurality of mobile applications.

11. The device of claim 8, where the requested one or more security scores correspond to security scores of mobile applications installed at the device.

12. The device of claim 8, where the requested one or more security scores include security scores determined, at least in part, through a manual analysis of the mobile applications.

13. The device of claim 8, where the processor is further to:
provide, for presentation, the requested one or more security scores.

14. The device of claim 8, where
the processor, when requesting the one or more security scores, is to:
request a first security score, of the one or more security scores, for a first mobile application of the one or more mobile applications; and
request a second security score, of the one or more security scores, for a second mobile application of the one or more mobile applications,
the processor, when receiving the requested one or more security scores, is to:
receive the first security score, and
receive the second security score, and
the processor is further to:
provide, for presentation, the received first security score and the received second security score.

15. A non-transitory computer readable medium storing instructions, the instructions comprising:
one or more instructions which, when executed by a processor of a device, cause the processor to:
request one or more security scores for one or more applications,
the one or more security scores defining a level of security risk corresponding to the one or more applications, and
a security score, of the one or more security scores, being based on:
a first security review performed on an application of the one or more applications,
the first security review resulting in a modified initial security score including a value within a first range, and a second security review performed on the application,
the second security review being different than the first security review, and
the second security review resulting in a further modified initial security score including a value within a second range,
the second range including an upper limit that is greater than an upper limit of the first range;
receive a policy relating to applications that are permitted to be used by the device,
the policy including a threshold security score value;
receive the requested one or more security scores; and
restrict use of a selected application, of the one or more applications, when a security score, of the one or more received security scores, corresponding to the selected application is below the threshold security score value.

16. The non-transitory computer readable medium of claim 15, where the one or more instructions to restrict the use of the selected application include:
one or more instructions to prevent the selected application from being installed on the device;
one or more instructions to prevent the selected application from being executed by the device;
one or more instructions to provide a user of the device with a notification when the selected application is executed by the device; or
one or more instructions to uninstalling the selected application from the device.

17. The non-transitory computer readable medium of claim 15, where the instructions further comprise:
one or more instructions to provide a graphical indication of a plurality of applications that are installed on the device and corresponding security scores of the installed plurality of applications.

18. The non-transitory computer readable medium of claim 15, where
the requested one or more security scores correspond to security scores of applications installed at the device, and
the requested one or more security scores include security scores determined, at least in part, through a manual analysis of the applications.

19. The non-transitory computer readable medium of claim 15, where the instructions further comprise:
one or more instructions to provide, for presentation, the requested one or more security scores.

20. The non-transitory computer readable medium of claim 15, where
the one or more instructions to request the one or more security scores include:
one or more instructions to request a first security score, of the one or more security scores, for a first application of the one or more applications; and
one or more instructions to request a second security score, of the one or more security scores, for a second application of the one or more applications,
the one or more instructions to receive the requested one or more security scores include:
one or more instructions to receive the first security score, and
one or more instructions to receive the second security score, and
the instructions further include:
one or more instructions to provide, for presentation, the received first security score and the received second security score.

* * * * *